United States Patent [19]

Hadden-Deering

[11] 4,188,099

[45] Feb. 12, 1980

[54] IMAGE PROJECTION APPARATUS WITH SUSTAINED IMAGE EXPOSURE

[76] Inventor: Phillip R. Hadden-Deering, 5 N. Dene, Birtley, Tyne and Wear, England

[21] Appl. No.: 867,411

[22] Filed: Jan. 6, 1978

[30] Foreign Application Priority Data

Jan. 6, 1977 [GB] United Kingdom ............... 280/77

[51] Int. Cl.² .................... G03B 21/32; G03B 21/26
[52] U.S. Cl. ........................... 353/94; 352/137
[58] Field of Search .................... 353/94; 352/137

[56] References Cited

U.S. PATENT DOCUMENTS

| | | | |
|---|---|---|---|
| 3,282,155 | 11/1966 | Cleary et al. | 353/94 |
| 3,301,628 | 1/1967 | Hellmund | 352/137 |
| 3,551,042 | 12/1970 | Brinks et al. | 353/76 |
| 3,622,236 | 11/1971 | Novy | 353/94 |
| 3,788,736 | 1/1974 | Oulevay et al. | 352/137 |
| 4,076,399 | 2/1978 | Schlei | 353/94 |
| 4,105,315 | 8/1978 | Fraser | 353/95 |

*Primary Examiner*—Steven L. Stephan
*Attorney, Agent, or Firm*—Sughrue, Rothwell, Mion, Zinn and Macpeak

[57] ABSTRACT

An image projector apparatus, for cinematograph film or the like transparent frames, includes a programmable control for instance operable from magnetic tape which may include audio signals stored in synchronism with the intended speed of transport of the frames by the projectors; more than one series of images, e.g. on two cinematograph films for superposed projection, are described and the projection dwell period for each image, in a series alternating with transport from frame to frame, is sustained over a broad range of image series speeds, e.g. normal slow-motion or accelerated viewing speeds.

2 Claims, 4 Drawing Figures

IMAGE PROJECTION APPARATUS WITH SUSTAINED IMAGE EXPOSURE

This invention relates to film drive mechanisms for for intermittently advancing film through visual image projectors.

According to the invention there is provided image projection apparatus including a programable control means for controlling at least the operation of a film transport mechanism to select the speed of film transport from frame to frame and sustained duration of the projection of each image in a series of images in accordance with a predeterminable program fed into the control means.

The invention will now be described, by way of example, with reference to the accompanying drawings, in which.

Figure 1:
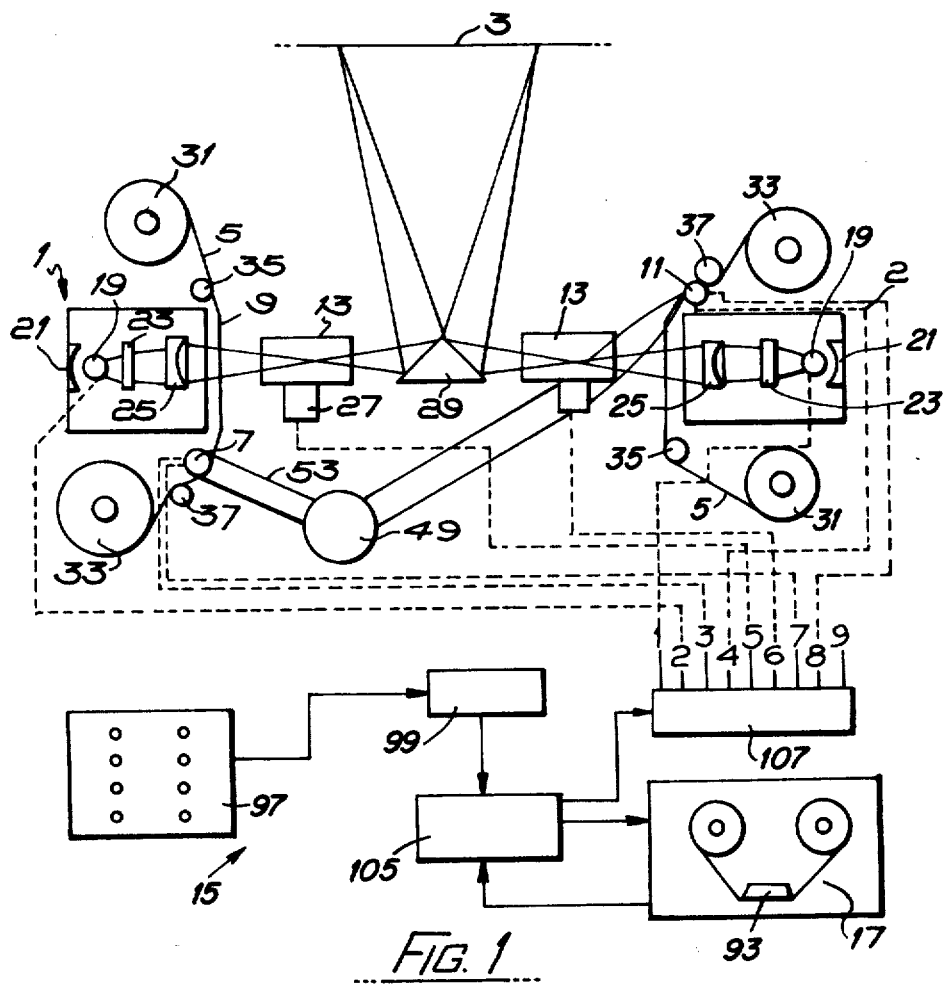
FIG. 1 is a schematic drawing of an audio visual projection system according to the invention.
Figure 2:
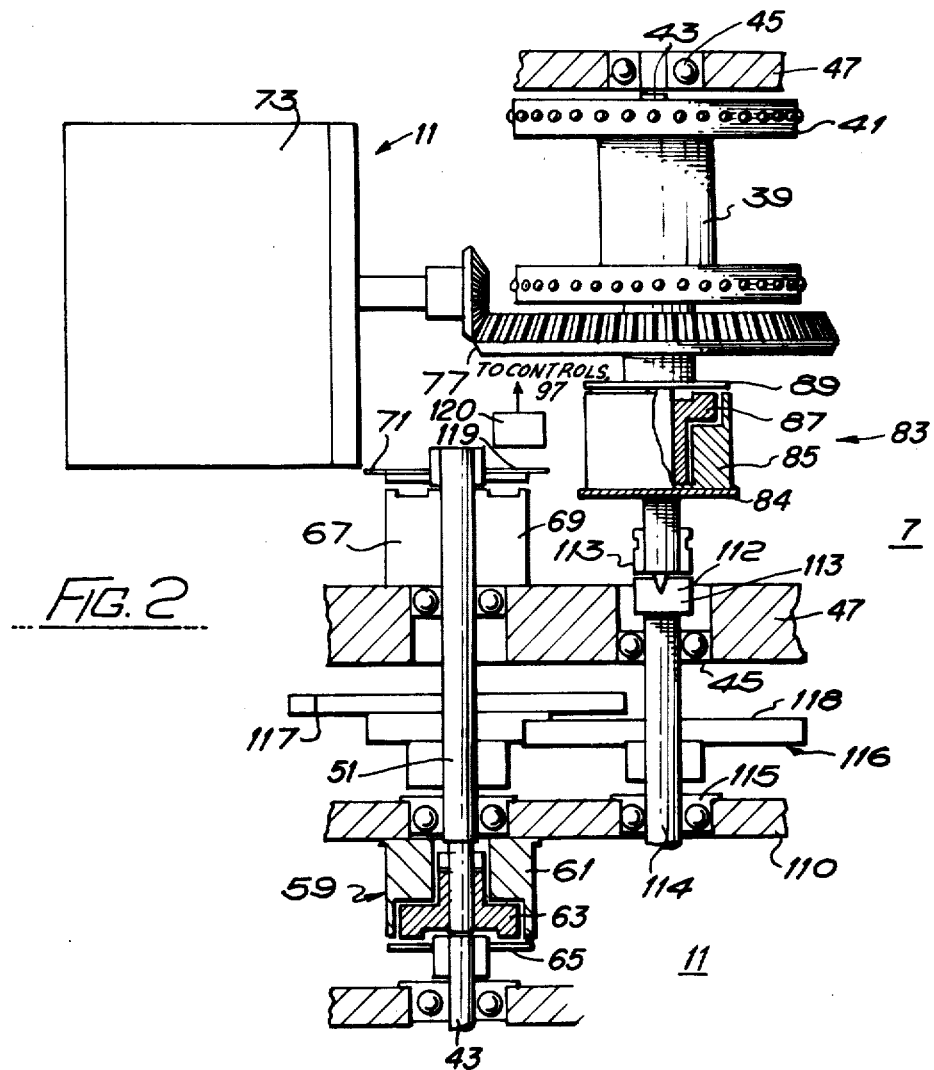
FIG. 2 is a plan view of a film drive mechanism in each of the projectors in the system of FIG. 1.

FIGS. 1 and 2 of the drawings show projection apparatus according to the invention which includes two film projectors 1, 2 arranged to project images on to a single screen 3 in synchronism with a sound track.

Figure 3:
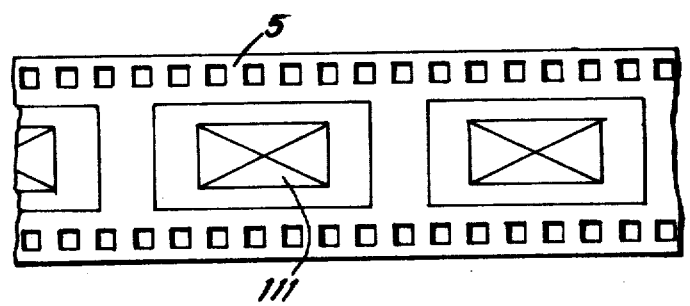
FIG. 3 is a film used in the system of FIG. 1.

Each of the projectors 1 and 2 is a film strip projector designed to project images of still photographs, each formed on a respective one of the frames of a reel of film 5, as shown in FIG. 3 which comprises a series of still transparencies 111 each occupying part of a frame, to allow for editing procedures. Within each projector 1 and 2 there is a film drive mechanism 7 which advances the film intermittently through a film gate 9 so that images of the stills are projected on to the screen 3 in sequence. The rate at which the film 5 is advanced between frames can approach the speed employed in a cinematographic projector i.e. 1/100th of a second. The length of time for which each still is projected can be varied independently of the speed of advance between frames.

An auxiliary drive mechanism 11, shown in FIG. 2, is provided for advancing the film 5 between frames at a variable slow speed so that a camera panning effect is obtained. A zoom lens 13 is also provided to enlarge the image on the screen.

The present system is used for producing and subsequently projecting an extended film strip programme. During this programme images are projected from either or both of the projectors 1, 2. A control unit 15, more completely shown in FIG. 4 which is used in compiling the programme and subsequently controls reproduction of the programme, includes a magnetic tape 17 upon which signals are recorded for controlling operation of the film drive mechanisms 7 and 11, the zoom lenses 13 and the lamps 19 in the projectors 1 and 2. A sound track is also recorded on a separate track of the tape 17.

The lamp 19 in each of the projectors 1 and 2 is supplied with current from a power supply (not shown). The power supply includes a thyristor control unit for varying the current and thus brightness of the lamp 19.

A reflector 21, heat filter 23 and condenser lenses 25 project light from each lamp 19 on to the film 5 in the film gate 9. A zoom motor 27 is provided to operate the zoom lens 13.

The two projectors 1, 2 are axially aligned and face one another and a prism or front surface mirrors 29 is arranged to reflect light from each projector on to the screen 3.

Each of the projectors 1, 2 has a supply spool 31 and a take-up spool 33, rollers 35 for tensioning and guiding film from each supply spool 31 to the associated gate 9, and rollers 37 to guide film from the gate 9 to the take-up spool 33.

The film is driven by a film drive mechanism 7, which is shown in more detail in FIG. 2 of the drawings.

In FIG. 2, each film drive mechanism 7 includes a sprocket wheel 39 which is disposed between the film gate 9 and the take-up spool 33. The sprocket wheel 39 has thirty two teeth 41 at each end thereof for engagement with sprocket holes in the film. The sprocket wheel 39 is mounted on a spindle 43 which is rotatably supported in bearings 45 on a base plate 47.

During normal operation, drive for the sprocket wheel 39 and spindle 51 in each projector 1 and 2 is provided by a main film drive motor 49, shown in FIG. 1. Motor 49 is coupled to a main drive shaft 43 in each projector via a respective belt and pulley drive 53, also shown in FIG. 1.

Referring now to FIG. 2 each main drive shaft 43 is supported in bearings 55 in a support 57, which extends parallel with the base plate 47. Each shaft 43 is axially aligned with the associated spindle 51 and there is a short spacing between one end of the shaft and the adjacent end of the spindle.

An electrically operable clutch mechanism 59 is provided for coupling each spindle 51 to the associated drive shaft 43. The clutch mechanism 59 includes a coil 61 which is mounted on the support 110, a drive rotor 61 which is secured to an end section of the spindle 51 and is disposed within the coil 61, and an armature disc 65 which is keyed to the adjacent end of the spindle 43.

Associated with each clutch mechanism 59 is an electrically operable brake mechanism 67 which is made up of a coil 69 and a brake disc 71 of magnetic material. The coil 69 is mounted on the support 47 so as to embrace an end section of the spindle 43 and the disc 71 is keyed to the spindle 43. Also on spindle 51 is placed the rotor 117 of a Geneva mechanism 116 which engages into the 'Maltese Cross' portion 118 of the Geneva mechanism 116 mounted on spindle 111 rotatable within bearings 45 and 115 in supports 47 and 110.

At the end of spindle 111 there is one half 114 of a 90° dog clutch 112 which engages with the upper half 113 of the dog clutch 112 at the end of spindle 43.

The main film drive motor 49 is energised so that the shaft 43 is rotated at a constant speed whenever the projectors 1 and 2 are swtiched on. Normally, no current is applied to the coil 61 of clutch mechanism 59 so that the disc 65 is not attracted to, and engaged with, the rotor 63. Current is supplied to the coil 69 of brake mechanism 67, however, so that brake disc 71 is attracted to the coil 69. The spindle 57 and sprocket wheel 39 are therefore decoupled from the shaft 43 and held stationary by the brake mechanism 67.

To actuate the film drive mechanism 7, switches connected to coils 61 and 69 are operated to cut off the supply of current to the coil 69 in the brake mechanism 67 and to cause current to be supplied to the coil 61 in clutch mechanism 59. This causes brake disc 71 to be released from the coil 69 whilst dics 65 is attracted to, and engaged with, rotor 63. Spindle 51 and the rotor 117 of Geneva mechanism 116 are therefore coupled to shaft 43 and rotated thereby. This results in the quarter rotation of the 'Maltese Cross' 118 for every full revolution of the rotor 117. The dog clutch 112 being drivably engaged rotates and sprocket wheel 39 one quarter revolution thus pulling the film 5 through the film gate 9 by means of sprockets 41. Fixed to the disc 71 of brake mechanism 67 will be a mask 119 in juxtaposition with a photo-electric cell 120. A slit in the mask 119 allows a signal pulse to be transmitted to the electronic controls 97 to de-energise coil 61 of clutch 59 and energise coil 69 of brake mechanism 67. This signal is used to ensure only one revolution of the Geneva rotor 117 and thus one frame only of film 5 is transported through the film gate 9. Once the succeeding frame arrives in the film gate 9 it remains there until such time as the cycle is required to be repeated which may be after a period of 30 milliseconds or longer.

The brake mechanism 67 is de-energised and clutch mechanism 59 is energised for sufficient time to move one frame of the film 5 from the gate 9 and to advance the succeeding frame into the gate.

Each of the auxilliary drive mechanisms 11 referred to above include an auxilliary motor 73 which is coupled to spindle 43 by means of a reduction gear 77 part of which is fixed to armature disc 89 of clutch 83 and thereby to sprocket wheel 39.

An auxiliary clutch mechanism 83 for coupling the spindle 43 to the drive shaft 111 is made up of a coil 85 which is mounted on the support 81, coaxially of the shaft 75, a drive rotor 87 which is secured to a section of the shaft 43 within the coil 85, and an armature disc 89 which is keyed to the adjacent end of the spindle 43.

Spindle 43 is coupled to the auxilliary motor 73 by decoupling the dog clutch mechanism 112 and energising the clutch mechanism 83 in similar manner to the above-described operation of clutch mechanism 59 in the film drive mechanism 7.

This enables the motor 73 via the reduction gear 77 and spindle 43 to rotate the sprocket wheel 39 without any rotation of the shaft 111. This in turn enables the film 5 to be drawn through the film gate 9 at variable slow speeds thus achieving a 'camera panning' effect when projected through the lens 13 onto a screen via a front surface mirror 29.

As mentioned above, the present system is designed for producing and subsequently projecting an extended filmstrip programme. During this programme there may be times when images are projected from either one or both of the projectors 1 and 2, there may be variations in the length of time for which images of stills are projected, and some stills may be subjected to panning and zoom effects. The control unit 15 is provided for use in compiling the programme and for subsequently controlling its reproduction.

Figure 4:
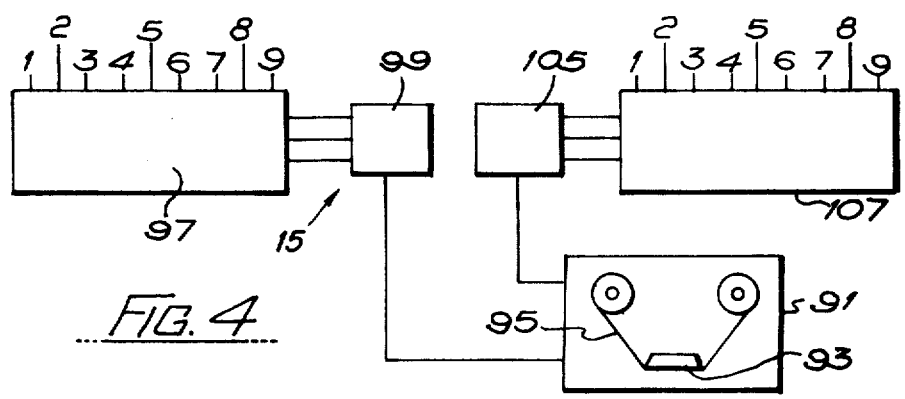
FIG. 4 is a diagram of a control unit for the projection system of FIG. 1.

Referring again to FIG. 1 and more particularly FIG. 4 the control unit 15 includes a tape recording machine 91 having a sound recording and reproducing head 93 for recording digital programme control signals on the magnetic tape 17 and for subsequently reproducing signals from the tape.

The unit 15 has a control panel 97 having a series of nine controls 1 to 9, each coupled to an associated variable resistor or switch (not shown). Controls 1 and 2 of panel 97 programme operation of the lamps 19 in projectors 1, 2, controls 3, 4 one film drive mechanism 7, controls 5, 6, the zoom motors 27, controls 7 and 8 the auxilliary drive mechanisms 11, and control 9 is spare.

In making up a programme each of the controls 1 to 9 is varied in accordance with the required variation in the output from the lamp 19, film drive mechanism 7 or 11, or zoom motor 27 associated with that control, as hereinafter described.

The control panel 97 is connected to a multiplexer/encoder 99 for scanning the settings of the controls 1 to 9 and generating a series of ten pulses, nine pulses having widths representing the setting of respective controls during each scan and a tenth pulse being a synchronisation pulse. The multiplexer/encoder 99 includes an astable collector-coupled multivibrator (not shown) and a decade counter and binary-coded decimal to decimal converter for generating output pulses which sequentially couple the switches and variable resistors associated with controls 1 to 9 of control panel 97 to a charging circuit of a multivibrator.

The output of the multiplexer/encoder 99 is connected to an input of the recording machine 91 and this input is in turn connected via an amplifier to the sound recording and reproducing head 93.

The output from the head 93 in the recording machine 91 and the output from the multiplexer/encoder 99 are connected to a decoder 105. Decoder 105, which includes a monostable device, a decade counter and an associated binary coded decimal to decimal converter, has ten outputs. At these outputs there is generated a pulse whose width corresponds to the width of a respective one of the pulses originally obtained from the multiplexer/encoder 99, and hence to the setting of an associated one of the controls 1 to 9 on panel 97. The outputs from decoder 105 are applied to actuators 107 which are connected respectively to the lamps 19, film drive mechanism 7, zoom motors 27 and auxilliary film drive mechanisms 11 associated with controls 1 to 9 of control panel 97.

To make-up the programme, a film 5 of the kind shown in FIG. 3 is loaded onto the supply spool 31 in each projector 1 and 2, and the motor 49 is energised so that the spindle 51 is rotated.

The operator switches on the tape recorder 91 which is used to simultaneously play back the pre-recorded sound track and, in synchronism, to record on a separate track of the magnetic tape 17 the conditions of controls 1 to 9.

The operator then operates manual controls associated each of the projector functions for each image or composite image in the programme.

The result comprises sets of nine control signals recorded on the tape 17, a set for each of the images or composite images in the programme, synchronised with the pre-recorded sound track.

Operation of the present system to display a programme compiled in the manner described above is effected under control of the signals recorded on the tape 17. As the tape is driven past the head 93 each set of nine digital signals is reproduced by the head and applied to the decoder 105, which provides a series of nine analogue pulses each having a pulse width representing the setting of the associated controls 1 to 9. There is then provided a signal for actuating the lamp 19, film drive mechanism 7, zoom motor 27 or auxiliary drive mechanism 11 associated with that output.

I claim:

1. Apparatus for projecting plural images onto a screen area comprising in combination:

a pair of projectors, each of said projectors having an illuminating projection lamp, a zoom focusing lens and a film transport mechanism, said film transport mechanism comprising a drive connected to a film advancing sprocket by a selectively operable clutch and brake and a Geneva transmission for frame-by-frame advancing of a film for normal movie film-type drive, the Geneva transmission being selectively disconnectable from the sprocket in favor of an auxiliary drive for slowly advancing the film for scanning of a frame;

reflecting means arranged with said projectors so as to project the images produced by said projectors in coincidence onto a common screen area;

means for on/off switching of each of said projection lamps;

means for driving each of said transport mechanisms at a selected speed;

means for moving each of said zoom lenses; and a control unit for controlling said switching means, said driving means and said zoom lens moving means, said control unit including a pre-programmed magnetic tape memory, a decoder and actuator means responsive to said decoder.

2. Apparatus according to claim 1, wherein said control means comprises a control panel with a switch for each projection function, a coder for encoding the switch states for each operation into a corresponding set of recordable signals, a tape recording and playback apparatus for recording said signals and subsequently reproducing the signals and feeding them to a decoder which produces command signals for operating the switches controlling the projection functions.

* * * * *